United States Patent
Manteiga et al.

(10) Patent No.: US 6,843,449 B1
(45) Date of Patent: Jan. 18, 2005

(54) FAIL-SAFE AIRCRAFT ENGINE MOUNTING SYSTEM

(75) Inventors: John Alan Manteiga, North Andover, MA (US); Christopher James Wilusz, Peabody, MA (US); Cornelius Harm Dykhuizen, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/774,771

(22) Filed: Feb. 9, 2004

(51) Int. Cl.[7] .............................................. B64D 27/00
(52) U.S. Cl. ........................ 244/54; 248/554; 60/39.31
(58) Field of Search .................... 244/54, 60; 248/554, 248/555; 60/39.31

(56) References Cited

U.S. PATENT DOCUMENTS

| | | | |
|---|---|---|---|
| 5,078,342 A | 1/1992 | Langley et al. | 244/54 |
| 5,303,880 A | 4/1994 | Cencula et al. | 244/54 |
| 5,320,307 A | 6/1994 | Spofford et al. | 244/54 |
| 5,351,930 A | 10/1994 | Gwinn et al. | 248/557 |
| 5,620,154 A | 4/1997 | Hey | 244/54 |
| 5,725,181 A | 3/1998 | Hey | 244/54 |
| 5,873,547 A * | 2/1999 | Dunstan | 244/54 |
| 6,296,203 B1 * | 10/2001 | Manteiga et al. | 244/54 |
| 6,330,995 B1 | 12/2001 | Mangeiga et al. | 248/554 |
| 6,341,746 B1 | 1/2002 | Pascal et al. | 244/54 |
| 6,494,403 B2 * | 12/2002 | Jule et al. | 244/54 |
| 6,607,165 B1 | 8/2003 | Manteiga et al. | 244/54 |
| 6,758,438 B2 * | 7/2004 | Brefort et al. | 244/54 |
| 2002/0104924 A1 * | 8/2002 | Roszak | 244/54 |
| 2003/0025033 A1 * | 2/2003 | Levert et al. | 244/54 |

* cited by examiner

*Primary Examiner*—J. Woodrow Eldred
(74) *Attorney, Agent, or Firm*—William Scott Andes; Alfred J. Mangels

(57) ABSTRACT

A fail-safe lug is carried by an engine frame member and receives a clevis carried by an engine mount member. The mount member includes side links that transmit transverse loads between the engines and the airframe and a thrust link that transmits axial, engine thrust loads between the engine and the airframe. A fail-safe pin is carried by the clevis and has an outer diameter that is smaller than an aperture in the lug and through which the pin passes, so that no loads are imposed on the fail-safe pin in normal operation. When one or more of the links are no longer capable of transmitting loads, the fail-safe arrangement becomes operative to accommodate the loads transmitted between the engine and the airframe.

5 Claims, 5 Drawing Sheets

FAIL-SAFE AIRCRAFT ENGINE MOUNTING SYSTEM

BACKGROUND OF THE INVENTION

The present invention relates to a mounting system for mounting an aircraft engine to an aircraft. More particularly, the present invention relates to a fail-safe engine mounting system that transmits between the engine and aircraft axial thrust loads, as well as lateral and vertical loads, in the event of a failure of the main load-transmitting elements.

Aircraft engines, such as turbojet engines and turbofan engines, are mounted on an aircraft in such a way as to transmit to the airframe of the aircraft engine thrust loads to propel the aircraft. At the same time, the engine-to-airframe mounting system must also be capable of sustaining pitch, roll, yaw, and other loads that pass between the engine and airframe. Such loads are the result of aircraft maneuvers, and they impose upon the engine axial loads that extend in the direction of the engine longitudinal axis, as well as loads that extend in a direction transverse to the engine longitudinal axis.

Turbojet and turbofan aircraft engines are commonly connected with an airframe at forward and aft points on the engine, typically at relatively rigid annular frame members that connect with annular engine casing sections. At least one of the mounts is intended to transmit engine thrust loads to the airframe. One form of such thrust-transmitting components is a thrust link arrangement that extends in a generally axial direction, relative to the engine longitudinal axis. Frequently, thrust links are provided in pairs, so that thrust loads can continue to be transmitted by one such link should the other link fail for some reason. However, dual thrust links impose a significant weight penalty because of the redundancy they provide. Accordingly, it is desirable to eliminate one thrust link to reduce the overall weight of the engine-to-airframe mounting system, while still providing sufficient load-carrying capacity should a single thrust link fail to transmit thrust loads.

In addition to utilizing only a single thrust link for weight reduction purposes, it is also desirable to provide a fail-safe arrangement in the event of failure of mount system components other than a thrust link.

BRIEF DESCRIPTION OF THE INVENTION

Briefly stated, in accordance with one aspect of the present invention a mounting system is provided for mounting an aircraft engine to an aircraft. The mounting system includes a first mount member including a first fail-safe clevis defined by a pair of first clevis ears having opposed faces that are spaced from each other for receiving therebetween a first fail-safe lug carried by an engine. The first fail-safe lug has outer surfaces that are each spaced from respective first clevis ear surfaces to define first fail-safe clevis gaps. A second mount member includes a second fail-safe clevis defined by a pair of second clevis ears having opposed faces that are spaced from each other for receiving therebetween a second fail-safe lug carried by the engine. The second fail-safe lug has outer surfaces that are each spaced from respective second clevis ear faces to define second fail-safe clevis gaps. The second fail-safe clevis gaps are smaller than the first fail-safe clevis gaps, so that upon a failure of a thrust link extending between the engine and an airframe structure for transmitting thrust loads the thrust loads are transmitted through the second mount member.

BRIEF DESCRIPTION OF THE DRAWINGS

The structure, operation, and advantages of the present invention will become further apparent upon consideration of the following description, taken in conjunction with the accompanying drawings in which.

DETAILED DESCRIPTION OF THE INVENTION

Figure 1:
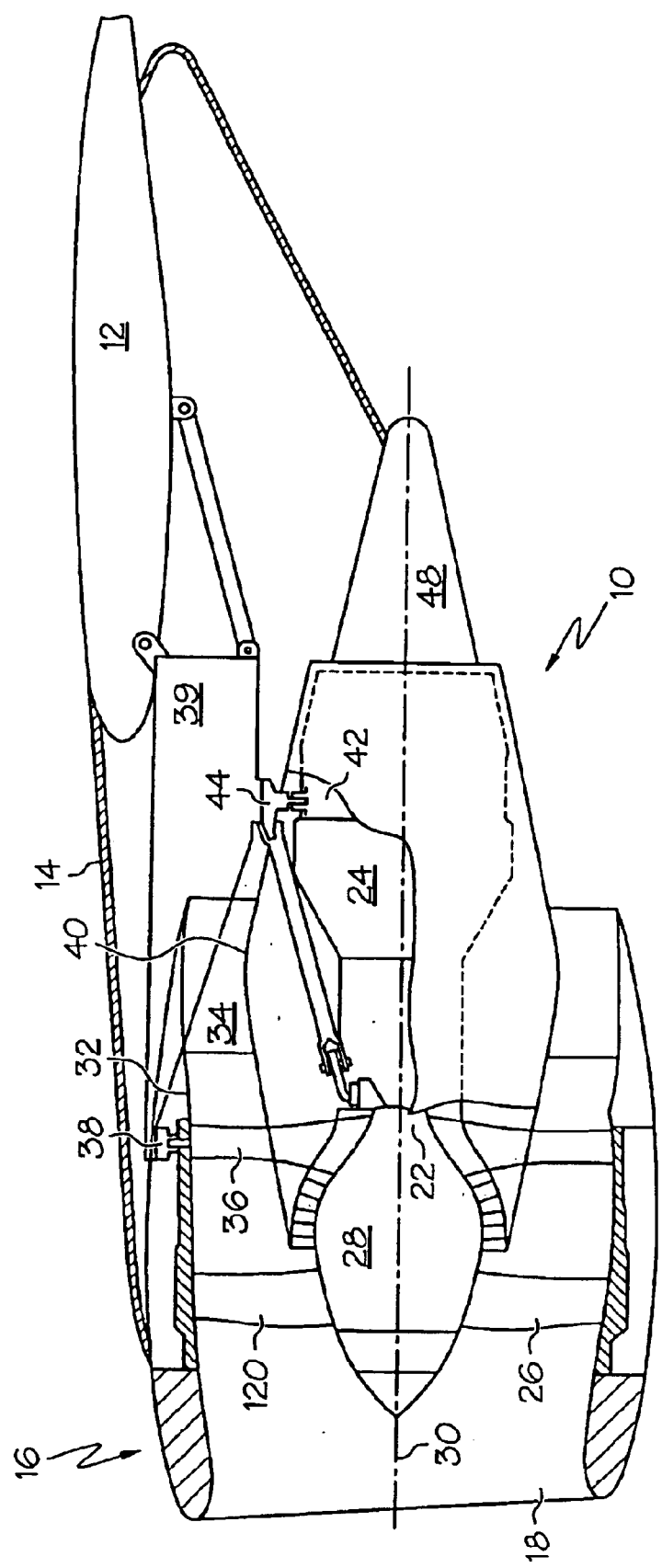
FIG. 1 is a side view, partially in section, of a turbofan aircraft engine mounted under an aircraft wing.
Figure 2:
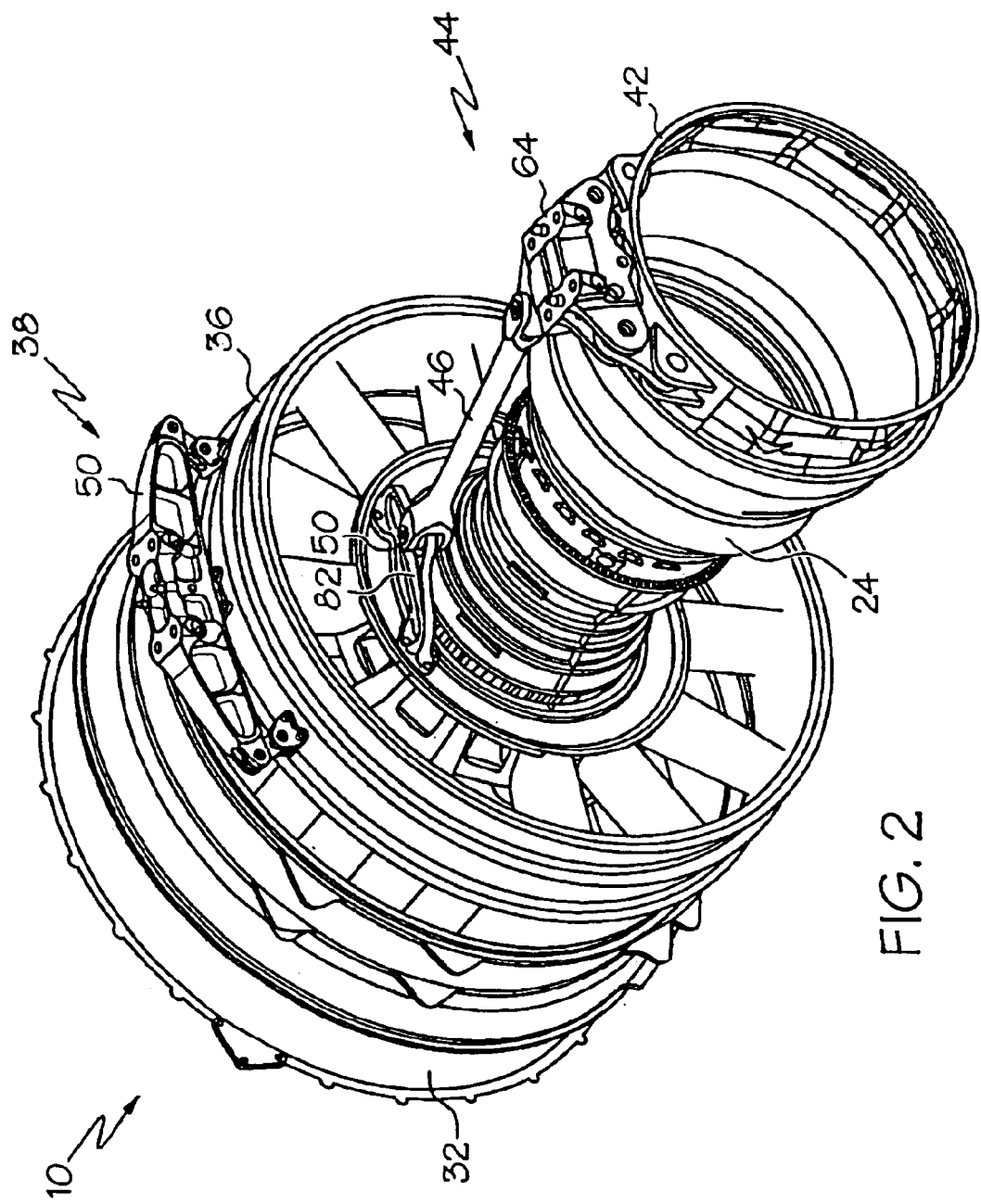
FIG. 2 is a rear perspective view of the engine of FIG. 1 showing the several elements of the engine-to-aircraft mounting system in position on the engine.

Referring now to the drawings, and particularly to FIGS. 1 and 2 thereof, there is shown an aircraft engine 10 and an associated mounting structure for mounting the engine to an aircraft wing 12 in a typical under-wing engine mounting arrangement. Aircraft wing 12 shown in FIG. 1 carries engine 10, which can be a turbofan engine, as shown, or, alternatively, a turbojet engine. Engine 10 is supported from wing 12 by an engine support structure that is enclosed within an aerodynamically-shaped pylon 14 carried by wing 12. Positioned at the forward, inlet end of engine 10 is a forward nacelle 16 in the form of an aerodynamically-shaped, annular shroud that defines an inlet through which air enters engine 10.

Engine 10 includes a front-mounted fan 20 that is coupled with and driven by a drive shaft 22 forming part of core gas turbine engine 24. Fan 20 includes a plurality of circumferentially-spaced, radially-extending fan blades 26 that are carried on a rotatable fan hub 28 that is connected with drive shaft 22 and that rotates about an engine longitudinal axis 30. An annular outer fan casing 32 is coaxial with and extends rearwardly from nacelle 16 to surround fan blades 26 to define the outer boundary of an annular fan airflow pathway 34. Fan casing 32 is connected with and supported from an annular fan frame member 36 that is also connected with core engine 24. Fan frame member 36 carries a forward engine mount 38 to connect the forward part of engine 10 with an engine support structure 39 carried by pylon 14.

Core engine 24 includes, in a forward-to-aft longitudinal direction, components in the form of a compressor, a combustion chamber, and a turbine, the structure and operation of which are familiar to those skilled in the art, and which will therefore not be further described. Surrounding and enclosing those core engine components is an annular core engine casing 40 that also defines the inner boundary of the fan airflow pathway 34. Engine casing 40 includes as an element an annular aft support frame 42 that is positioned adjacent the core engine turbine and can be in the form of a turbine frame. Aft support frame 42 carries a rear engine mount 44 to connect a downstream portion of core engine 24 with engine support structure 39. Extending forwardly from rear engine mount 44 is a thrust link 46 that interconnects rear engine mount 44 with fan frame 36 for transmitting engine thrust loads to the aircraft through engine support structure 39 and wing 12 to propel the aircraft in a forward direction, and also to transmit reverse thrust to the aircraft for braking purposes during landing. Also shown in FIG. 1 is an exhaust cone 48 that extends rearwardly of the turbine within core engine to provide a fairing-like element to define an inner guide surface for exhaust gas flow as it exits from core engine 24.

Figure 3:
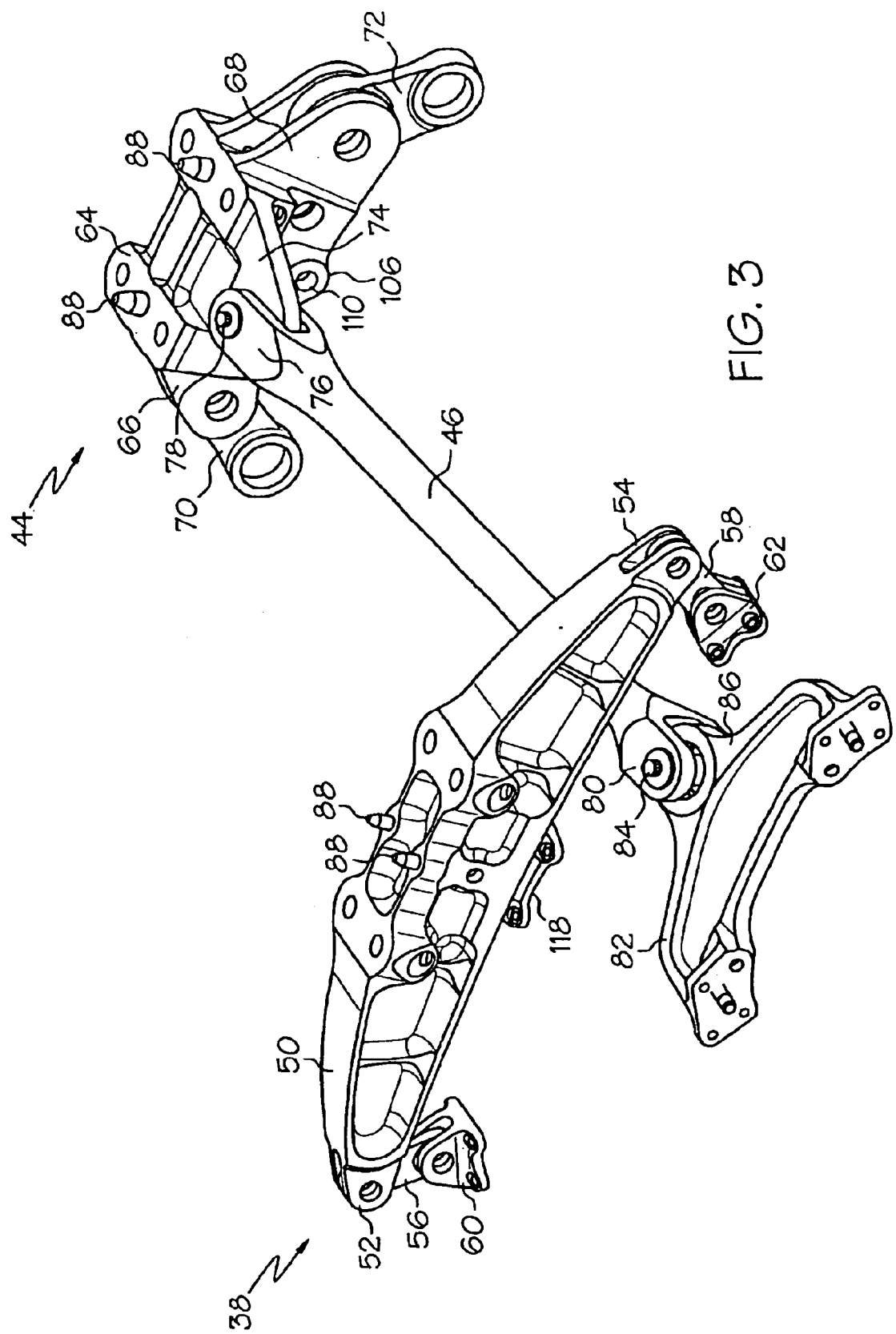
FIG. 3 is a perspective view, looking aft, showing the forward and aft engine mount elements without the associated engine and aircraft structures.

Engine 10 and the associated engine mounting system components shown diagrammatically in FIG. 1 are shown in more detailed form in FIGS. 2 and 3. As shown, forward engine mount 38 includes a front mount member 50 that is shown as an arc-shaped member that extends in a transverse direction relative to engine longitudinal axis 30. The outer ends 52, 54 of front mount member 50 are connected with fan frame 36 by a pair of forward mount links 56, 58, respectively, that are each pivotably connected with the ends of front mount member 50, and are also pivotably connected with respective circumferentially-spaced devises 60, 62 carried on the outer periphery of fan frame 36 by respective pivot pins. The combination of front mount member 50, mount links 56, 58, and fan frame 36 define a four-bar linkage arrangement.

Rear engine mount 44 includes a rear mount member 64 that is also a generally arc-shaped element, similar to the overall shape of front mount member 50. Rear mount member 64 carries at respective outer ends 66, 68 a pair of laterally-spaced links 70, 72 that each extend outwardly in opposite lateral directions relative to engine longitudinal axis 30. Link 72 is a boomerang-shaped link having legs that define an obtuse included angle. Link 72 is connected with rear mount member 64 at two laterally-spaced points by respective ball joints that allow pivotal movement of link 72 about a transverse axis that is substantially perpendicular to engine axis 30. However, because of the two-point connection between link 72 and rear mount member 64, link 72 is not pivotable about an axis that is substantially parallel to engine longitudinal axis 30. Link 70, on the other hand, is a swingable link that is freely pivotably connected to rear mount member 64 by respective ball joints adjacent each end of link 70.

Extending generally axially relative to the engine longitudinal axis and in a forward direction from rear mount member 64 is thrust link tab 74 (see FIG. 3). A thrust link 46 is pivotably connected to thrust link tab 74 by means of a clevis 76 carried at the aft end of thrust link 46, to allow pivoting movement of thrust link 46 in a transverse direction, and about a generally radially-extending pivot axis relative to the engine longitudinal axis and defined by pivot pin 78. The forward end of thrust link 46 includes a clevis 80 that is connected to a fan frame yoke 82 by a pivot pin 84 that passes through yoke tab 86, to allow relative pivoting movement between thrust link 46 and fan frame yoke 82 about a generally radially-extending pivot axis defined by pivot pin 84.

Each of front mount member 50 and rear mount member 64 includes locating pins 88 to facilitate accurately positioning the respective mounts with respect to the associated parts of the airframe, and also to prevent pivoting movement of those mount members relative to the airframe structure. Each of the mount members is securely connected to the airframe structure by suitable connecting bolts (not shown), or the like.

Figure 4:
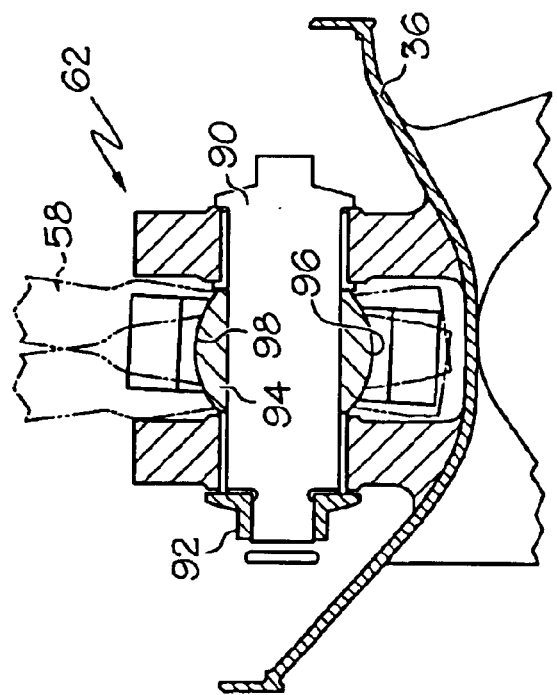
FIG. 4 is a fragmentary cross-sectional view through a typical pinned joint for the aft engine mount shown in FIG. 4 including a connecting link that extends from the engine mount to the engine outer casing.

The configuration of the pivotable connections between front mount member 50 and rear mount member 64 and engine 10 are shown in cross section in FIG. 4. The clevis ears of the respective elements (clevis 62 is shown in FIG. 4 for illustrative purposes) carried by fan frame 36 and by aft support frame 42 each include coaxial apertures to receive a pivot pin 90, which can be in the form of a bolt, that passes through the clevis ears and through associated link 58 and is suitably secured against axial movement, such as by a nut 92. Pivot pin 90 carries on its shank portion, between the ends of the pin, a sleeve 94 that includes a spherically-shaped, convex outer surface 96 that engages with a similarly-spherically-shaped concave inner surface 98 formed within the link end apertures of the respective links, such as link 58 as shown. Such a ball-joint arrangement allows multi-degrees of freedom of movement of the connecting link ends relative to the associated clevises, to allow for variations of engine and aircraft load directions, and for different rates and directions of movement of the connected parts relative to each other. Such relative movements can result from aircraft maneuver loads and also from differences in thermal expansion or contraction rates of the engine relative to the associated airframe parts to which it is mounted.

Figure 5:
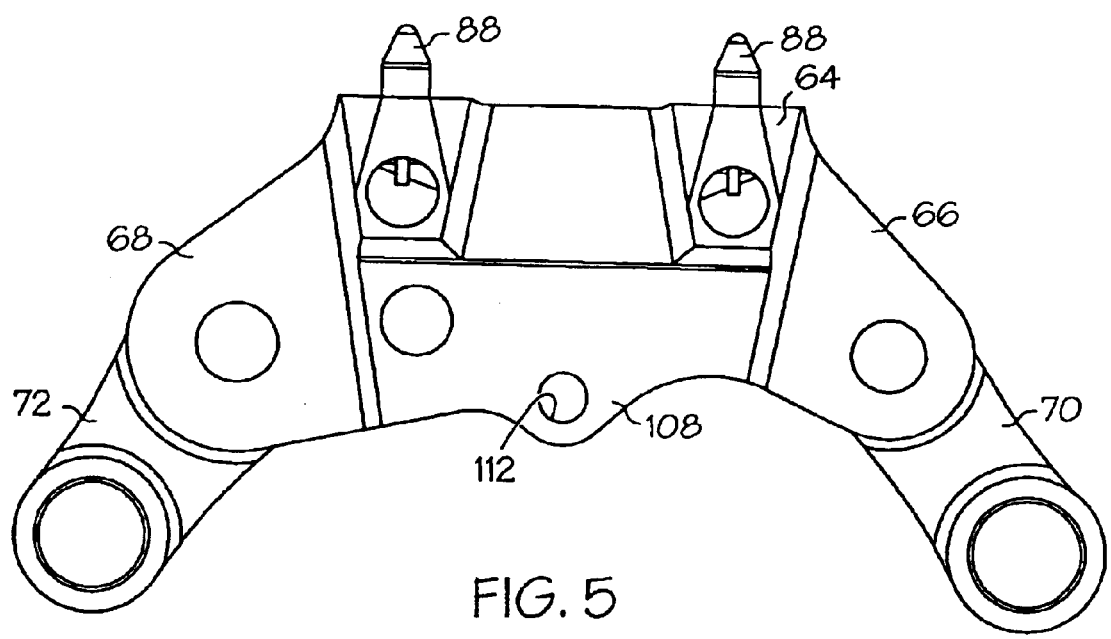
FIG. 5 is an elevational view of the aft face of the aft engine mount shown in FIGS. 2 and 3.
Figure 6:
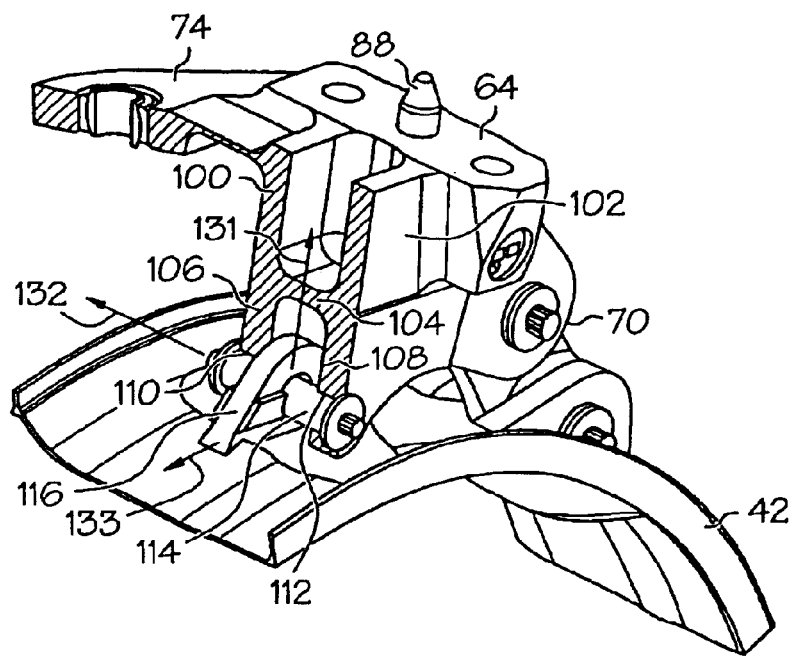
FIG. 6 is a fragmentary perspective view of the aft engine mount shown in FIG. 4, partially in section, viewed from aft in a forward direction and showing the connection between the engine mount body member and a fail-safe lug carried by the engine casing.

Referring to FIGS. 5 and 6, the center body portion of rear mount member 64 is defined by a pair of spaced, substantially parallel forward and rear walls 100, 102, respectively, that are interconnected by an intermediate rib or bridging member 104. In addition to structurally carrying the end devises on rear mount member 64 that connect with links 70 and 72, the center portions of forward and rear walls 100, 102 each include a substantially centrally-positioned, downwardly-extending ear 106, 108, respectively. Ears 106, 108 together define a rear fail-safe clevis and include coaxially disposed apertures 110, 112, respectively, for receiving a fail-safe pin 114, which can be in the form of a bolt.

The rear fail-safe clevis carried by rear mount member 64 is positioned so that ears 106, 108 lie on respective opposite faces of a radially-outwardly-extending, rear fail-safe lug 116 that is carried by aft support frame 42. Lug 116 can be integrally formed on aft support frame 42, particularly if the frame is a casting, or it can be in the form of a separate lug (not shown) that has a base that is bolted to aft support frame 42 in a manner similar to the bolting of a corresponding forward fail-safe clevis lug 118 (see FIG. 3) to fan frame 36.

Forward fail-safe clevis lug 118 is received within a slot formed in front mount member 50 that defines a front fail-safe clevis. Lug 118 and front mount member 50 also receive a fail-safe pin similar to fail-safe pin 114 provided in rear mount member 64. The axial dimension of the slot, whereby front mount member 50 functions as a clevis, defines a space that is similar to the space between the opposed inner surfaces of rear fail-safe clevis ears 106 and 108. However, the gaps between forward fail-safe clevis lug 118 and the slot wall surfaces in front mount member 50 are larger than the gaps between rear fail-safe clevis lug 116 and the opposed inner surfaces of rear fail-safe clevis ears 106 and 108.

Figure 7:
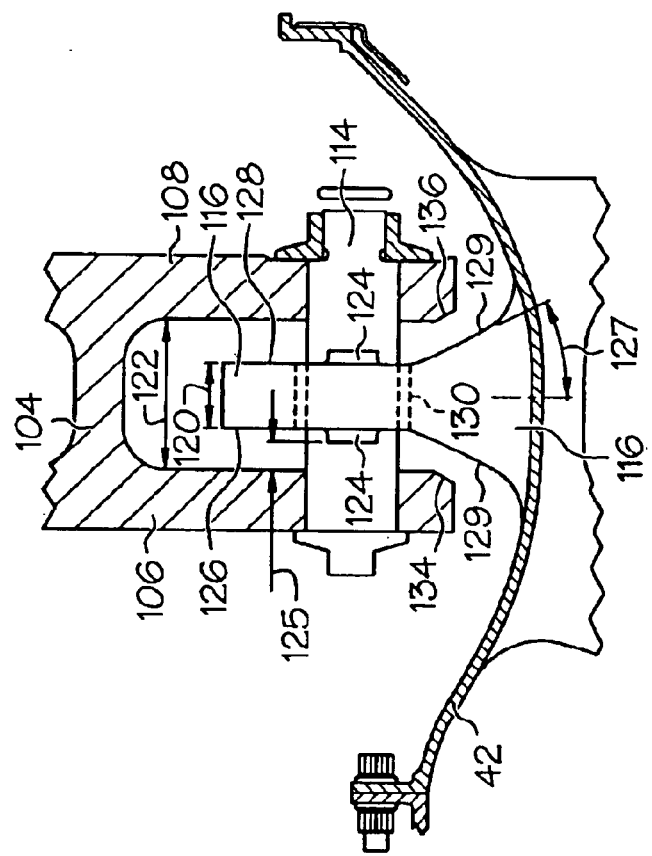
FIG. 7 is a fragmentary side sectional view of a fail-safe lug and a fail-safe shear pin in association with a portion of the aft engine mount.

Referring to FIG. 7, the body of fail-safe lug 116 is positioned between clevis ears 106, 108. The thickness of the body of fail-safe lug 116, in an axial direction of engine 10 relative to engine longitudinal axis 30, is shown as dimension 120 and is smaller than the corresponding axial spacing between the inner surfaces of ears 106, 108, shown as dimension 122, to provide a forward and a rear gap or spacing between ears 106, 108 and fail-safe lug 116. Additionally, lug 116 can have an outwardly-extending, flat land area 124 on each of forward and rear surfaces 126, 128, respectively, to define respective contact or bearing surfaces for contacting one or the other of ear inner surfaces 126, 128 in the event of a failure of thrust link 46 to transmit thrust loads. The gap would then be somewhat smaller, as represented by arrow 125. The diameter of lug aperture 130 is larger than the outer diameter of the shank of fail-safe pin 114, to provide 360° of clearance between the outer surface of fail-safe pin 114 and the inner surface of lug aperture 130 when rear mount member 64 is initially connected to engine 10 and during the time the engine-airframe mounting arrangement is functioning normally.

As shown in FIG. 7, fail-safe lug 116 has a base width, in the direction of engine longitudinal axis 30, that is larger than the lug body width represented by dimension 120. The larger base provides additional lug strength in order for the lug to accommodate the bending loads imposed on it when the engine thrust loads are transmitted through the lug. And because of angle 127 of each of the forward and aft outer surfaces 129 at the base of lug 116, which can be of the order of about 25°, the lower inner edges 134, 136 of clevis ears 106, 108, respectively, can have a chamfer that has an inclination angle similar to taper angle 127, so that the thrust loads are imposed over a larger surface area of lug 116 and to avoid stress concentrations that could otherwise be caused by right-angle corners at the lower inner edges of clevis ears 106, 108 that would bear against outer surfaces 129.

In operation, during normal engine and aircraft operation front and rear engine mounts 38, 44 transmit in-plane loads between engine 10 and the associated airframe structure. In that regard, in-plane loads are those loads that are generally directed in transverse planes that extend perpendicularly relative to engine longitudinal axis 30. Such in-plane loads include loads that act in a vertical direction, radially relative to fan frame 36 and aft support frame 42, and represented by arrow 131 of FIG. 6, as well as loads that act in a lateral, generally tangential direction relative to fan frame 36 and aft support frame 42, as represented by arrow 133 in FIG. 6. Thrust loads are transmitted from the engine to the airframe through thrust link 46 and rear engine mount 44. Thus, during normal operation, when thrust link 46 is intact and is operative to transmit thrust loads, the fail-safe clevis of rear mount member 64 and fail-safe lug 116 do not contact each other because of their spacing from each other. Accordingly, under normal conditions the fail-safe arrangement is inoperative and is in what can be called a standby condition.

If thrust link 46 is no longer capable of transmitting thrust loads between engine 10 and engine support structure 39 of the airframe, the rear engine mount fail-safe arrangement becomes operative. In that event thrust loads, represented by arrow 132 in FIG. 6, are transmitted by contact between fail-safe clevis ears 106 or 108 and fail-safe lug 116. Thus, when the engine is to provide forward thrust to the aircraft in such a situation, the engine shifts forward in a substantially axial direction until land area 124 of forward surface 126 of fail-safe lug 116 comes into surface-to-surface contact with the inner face of fail-safe clevis ear 106, to exert a forwardly-directed force that is transmitted to the airframe by rear engine mount member 64. And when the engine is to provide reverse thrust, to slow the aircraft during landing, the engine shifts rearward in a substantially axial direction until land area 124 of rear surface 128 of fail-safe lug 116 comes into surface-to-surface contact with the inner face of fail-safe clevis ear 108, to exert a rearwardly-directed force that is transmitted to the airframe by rear engine mount member 64. Moreover, because the gaps between forward fail-safe clevis lug 118 and the slot wall surfaces in front mount member 50 are larger than the gaps between rear fail-safe clevis lug 116 and the opposed inner surfaces of rear fail-safe clevis ears 106 and 108, front mount member 50 does not transmit any thrust loads. Thus, only the fail-safe arrangement at rear mount member 64 transmits thrust loads in the event of a failure of thrust link 46.

If one or both of links 70, 72 of rear engine mount 44 is no longer capable of transmitting vertical or tangential loads, the fail-safe arrangement becomes operative. In that event, a substitute or backup load transmission path between the engine and the airframe structure is provided by virtue of contact between pin 114 and fail-safe lug 116. That contact results from the relative movement between the pair of fail-safe ears 106, 108, which carry pin 114, and fail-safe lug 116. Thus, fail-safe lug 116 can also accommodate and transmit tangential or side loads, represented by arrow 133 in FIG. 6, in the event of a lateral link failure.

The fore-and-aft movements of the engine relative to the airframe are accommodated by the front and rear mount members, which can pivot about respective transverse axes because of the ball-joint connections between the respective links and the engine-mounted clevises.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the present invention.

What is claimed is:

1. A mounting system for mounting an aircraft engine to an aircraft, said mounting system comprising:

a) a first mount member including a first fail-safe clevis defined by a pair of first clevis ears having opposed faces that are spaced from each other for receiving therebetween a first fail-safe lug carried by an engine, the first fail-safe lug having outer surfaces that are each spaced from respective first clevis ear surfaces to define first fail-safe clevis gaps; and b) a second mount member including a second fail-safe clevis defined by a pair of second clevis ears having opposed faces that are spaced from each other for receiving therebetween a second fail-safe lug carried by the engine, the second fail-safe lug having outer surfaces that are each spaced from respective second clevis ear faces to define second fail-safe clevis gaps; wherein the second fail-safe clevis gaps are smaller than the first fail-safe clevis gaps, so that upon a failure of a thrust link extending between the engine and an airframe structure for transmitting thrust loads the thrust loads are transmitted through the second mount member.

2. A mounting system in accordance with claim 1, wherein the first mount member is associated with a forward engine mount and the second mount member is associated with a rear engine mount.

3. A mounting system in accordance with claim 1, wherein the second mount member includes first and second links for connecting the second mount member with an engine frame member, and wherein the first link is pivotably carried by the second mount member for pivotal movement about an axis that is parallel with a longitudinal axis of the engine, and the second link is fixedly carried by the second mount member.

4. A mounting system in accordance with claim 3, wherein the links have outer ends defined by ball joints.

5. A mounting system in accordance with claim 1, wherein the second mount member comprises:

a) a body member including a substantially centrally-positioned fail-safe clevis and a pair of laterally-spaced mount links, wherein a first mount link is pivotably connected with the body member and a second mount link is non-pivotably connected with the body member, the first and second mount links positioned at opposite sides of the fail-safe clevis for connection with an engine casing, the body member and first and second links each extending substantially parallel to an engine longitudinal centerline;

b) a substantially annular engine casing having a radially-outwardly-extending lug including a unitary lug aperture, and a pair of casing devises each extending radially outwardly and spaced circumferentially from each other along an outer periphery of the casing on opposite sides of the lug, wherein the lug defines a tab that is pivotally connected with the fail-safe clevis by a lug shear pin, wherein the casing devises are connected with respective ones of the first and second mount links of the body member with connecting pins that allow pivotal movement between the mount links and the respective casing clevises, wherein the lug includes forward and aft-facing outer faces that are spaced from respective inner faces of the fail-safe clevis, and wherein the lug aperture is larger than the lug shear pin to provide an initial annular clearance therebetween; and c) a unitary thrust link extending from the body member to an airframe portion of the aircraft to transfer engine thrust loads to the aircraft, wherein the fail-safe clevis an the casing lug transmit loads between the engine casing and the airframe upon failure of one or more of the thrust link and the mount links.

\* \* \* \* \*